United States Patent [19]

Yamazaki et al.

[11] Patent Number: 5,530,105

[45] Date of Patent: Jun. 25, 1996

[54] TETRAKISAZO COMPOUND AND INK CONTAINING THE COMPOUND

[75] Inventors: Satoshi Yamazaki, Shijonawate; Hideo Kawashita, Minoo; Koji Aburada, Sumiyoshi-ku; Kazuya Ogino, Minoo; Yuriko Tamura, Ibaraki; Takashi Omura, Kobe, all of Japan

[73] Assignee: Sumitomo Chemical Company, Limited, Osaka, Japan

[21] Appl. No.: 313,458

[22] Filed: Sep. 27, 1994

[30] Foreign Application Priority Data

Sep. 27, 1993 [JP] Japan .................................. 5-264327

[51] Int. Cl.$^6$ ........................... C09B 35/62; C09D 11/02
[52] U.S. Cl. ........................ 534/678; 534/666; 534/668; 534/685; 534/806; 106/22 K
[58] Field of Search .................... 534/666, 668, 534/678, 685, 806; 106/22 K

[56] References Cited

U.S. PATENT DOCUMENTS

| | | | |
|---|---|---|---|
| 1,901,390 | 3/1933 | Fleishhauer et al. | 534/679 |
| 4,395,288 | 7/1983 | Eida et al. | 106/22 X |
| 4,767,459 | 8/1988 | Greenwood et al. | 106/22 K |

FOREIGN PATENT DOCUMENTS

| | | |
|---|---|---|
| 0316069 | 5/1989 | European Pat. Off. . |
| 0539178 | 4/1993 | European Pat. Off. . |
| 464576 | 3/1914 | France . |
| 702412 | 4/1931 | France . |
| 943662 | 5/1956 | Germany . |
| 55-144069 | 11/1980 | Japan . |
| 61-18590 | 5/1986 | Japan . |
| 63-105079 | 5/1988 | Japan . |
| 1-048873 | 2/1989 | Japan . |
| 1-141966 | 6/1989 | Japan . |
| 7969 | of 1896 | United Kingdom .......... 534/806 |
| 18977 | of 1900 | United Kingdom . |

OTHER PUBLICATIONS

Chemical Abstracts, vol. 112, 42, 1990, abstract No. 112:100883q, Yuichi Kobayashi et al., "Marking ink compositions for impervious substrates".

Chemical Abstracts, vol. 94, 1981, abstract No. 94:158519b, Canon K.K., "Jet–printing inks".

Chemical Abstract, vol. 111, No. 20, 1989, Columbus, Ohio, US; abstract No. 176421n & JP-A-01 048 873 (Ricoh Co Ltd) & Registry (Database, STN) RN: 123366-22-3, 123370-71-8, 123370-73-0, 123370-74-1, 123370-75-2, 123370-76-3.

JP-A-01 048 873 corresponds to *Chemical Abstracts*, vol. 111, no. 20, 1989 cited above.

Chemical Abstracts, vol. 112, No. 12, 1990, Columbus, Ohio, US; abstract No. 100884r & JP-A-01 141 966 (Ricoh Co Ltd.) & Registry (Database, STN) RN: 125362-39-2.

JP-A-01 141 966 corresponds to *Chemical abstracts*, vol. 112, No. 12, 1990 cited above.

*Primary Examiner*—Fiona T. Powers
*Attorney, Agent, or Firm*—Watson Cole Stevens Davis

[57] ABSTRACT

A tetrakisazo compound represented by the following formula (1) in the free acid form:

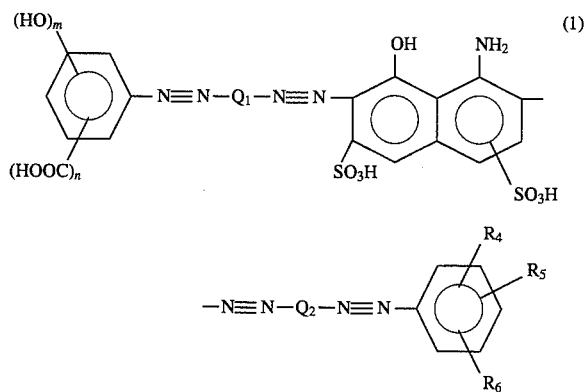

wherein $Q_1$ and $Q_2$ independently represent phenylene or naphthylene group which may be optionally substituted, $R_4$, $R_5$ and $R_6$ independently represent a hydrogen atom, a halogen atom, a hydroxy group, a sulfonic acid group or an amino, alkyl, alkoxy, carbamoyl or sulfamoyl group which may be optionally substituted, m is 0 or 1 and n is 1 or 2, and an ink which comprises the tetrakisazo compound. The ink exhibit excellent properties for ink jet printing.

11 Claims, No Drawings

TETRAKISAZO COMPOUND AND INK CONTAINING THE COMPOUND

The present invention relates to a tetrakisazo compound and its use, and particularly to an ink for an ink-jet printer containing the compound.

An aqueous ink for ink-jet printing comprises basically a dye, an organic solvent and water. The ink has to satisfy various requirements for conducting satisfactory ink-jet printing. The properties of the ink, such as the viscosity, the surface tention, the relative conductivity, the specific density and the pH, have to be in optimum ranges which vary depending on how to produce the ink-drops and how to control the direction of ink-drops.

These properties have to be maintained for a long period of time. For this purpose, it is required that the ink be free from depositions while storing for a long period, while conducting ink jet printing for a long period or while leaving the ink composition in an ink jet printer without operating it for a long period of time. Since, the diameter of an ink-jet nozzle is usually about 10–60 μm, if deposition is caused, the nozzle is often clogged by the deposition and the ink drops can not be jetted from the nozzle. Even when the nozzle is not clogged completely, print quality, jet stability and jet response are often lowered due to a solid component or a sticky component sticking in the vicinity of the nozzle.

It is also required that the ink can give clear recording images having sufficient contrast, water-durability and light-durability. The ink is also desired to give recording images which do not to cause blots when a mark is drawn over the images with a pen, such as a pen having a felt-made pen point and using an aqueous fluorescence ink. (Hereinafter this characteristic of the images is referred to as "blot resistance" and a pen having a felt-made pen point is referred to as "felt pen".)

For ink-jet printers utilizing thermal energy recently developpod, an ink having excellent thermal stability is required.

Since the above-mentioned properties of the ink for ink-jet printing are greatly influenced by characteristics of the dye comprised in the ink, dye which give the ink the above-mentioned desired properties have been desired.

Hitherto, in order to improve the above-mentioned properties, trisazo compounds described in JP-A-63-105079 ("JP-A-" means Japanese unexamined patent publication, i.e. "Kokai") and tetrakissazo compounds described in JP-A-55- 144069, JP-A-1-141966 or JP-B-61-18590 ("JP-B-" means Japanese examined patent publication i.e. "Kokoku") have been proposed, however, a dye compound which satisfies all of the above-mentioned requirements has not yet been found.

It is the object of the present invention to provide new tetrakisazo compounds which impart the ink excellent properties, such as jet stability, jet response and storage stability. The ink should give clear recording images having sufficient contrast, water resistance and light fastness. This object is achieved by the present invention.

The present invention provides a tetrakisazo compound represented by the following formula (1) in the free acid form:

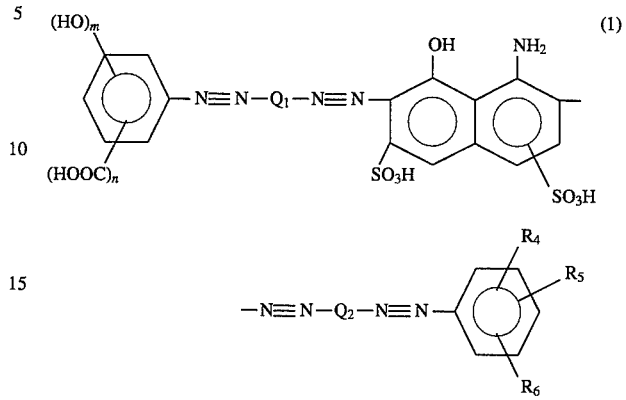

wherein $Q_1$ and $Q_2$ independently represent phenylene or naphthylene group which may be optionally substituted by a substituent described below, $R_4$, $R_5$ and $R_6$ independently represent a hydrogen atom, a halogen atom, a hydroxy group, a sulfonic acid group or an amino, alkyl, alkoxy, carbamoyl or sulfamoyl group which may be optionally substituted by a substituent as described below, m is 0 or 1 and n is 1 or 2.

The present invention also provides an ink which contains the tetrakisazo compound of the formula (1).

Among the compounds represented by the formula (1), a compound represented by the following formula (2) in the free acid form is preferred:

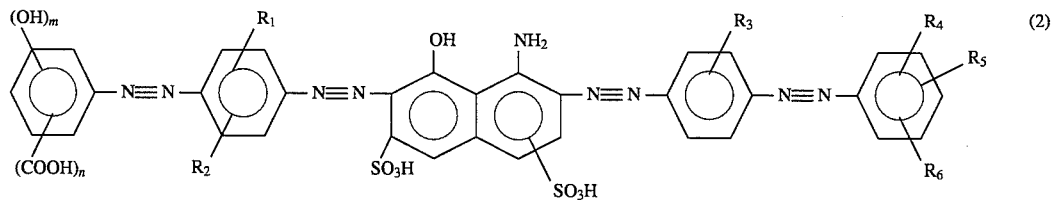

wherein $R_1$, $R_2$ and $R_3$ independently represent a hydrogen atom, a halogen atom, a carboxyl group, a hydroxyethylsulfo n group or an amino, alkyl, alkoxy, carbamoyl or sulfamoyl group which may be optionally substituted by a substituent as described below and $R_4$, $R_5$, $R_6$, m and n are as defined above.

Among the compounds represented by the formula (2), a compound represented by the following formula (3) in the free acid form is more preferred as an ink for ink-jet printing:

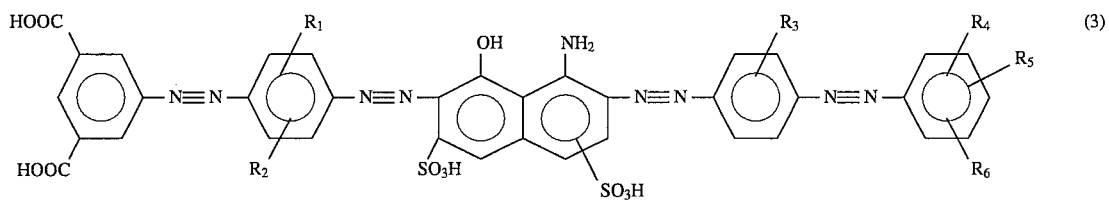

wherein $R_1$, $R_2$, $R_3$, $R_4$, $R_5$ and $R_6$ are as defined above.

Among the compounds represented by the formula (3), a compound represented by the following formula (4) in the free acid form is further more preferred:

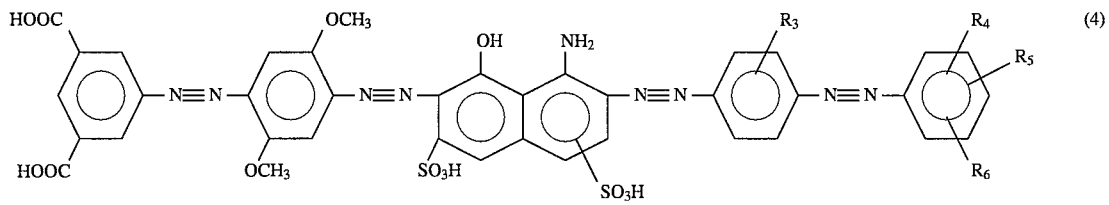

wherein $R_3$, $R_4$, $R_5$ and $R_6$ are as defined above.

$Q_1$ and $Q_2$ in the formula (1) are the same or different and each a phenylene or naphthylene group which are unsubstituted or substituted. Examples of groups which can be a substituent of the phenylene or naphthylene group include a carboxyl group, a halogen atom such as chlorine, fluorine, bromine, a hydroxy group, a hydroxyethylsulfone group, a sulfonic acid group or an amino, alkyl, alkoxy, carbamoyl and sulfamoyl group which may be optionally substituted.

The substituted amino group may be a mono- or disubstituted amino group. As examples of the substituted amino group, a mono $C_1$–$C_4$ alkylamino group, a di $C_1$–$C_4$ alkylamino group, an acylamino group such as an acetylamino group, a propionylamino group and a benzoylamino group can be mentioned. As examples of the substituted alkyl group, a hydroxy $C_1$–$C_4$ alkyl group, a halogeno $C_1$–$C_4$ alkyl group, a cyano $C_1$–$C_4$ alkyl group and a benzyl group can be mentioned. As examples of the substituted alkoxy group, a hydroxy $C_1$–$C_4$ alkoxy group and a $C_1$–$C_4$ alkoxy group substituted by a $C_1$–$C_4$ alkoxy group can be mentioned. As examples of the substituted carbamoyl group, a carbamoyl group substituted by a $C_1$–$C_4$ alkyl group can be mentioned. As examples of the substituted sulfamoyl group, a sulfamoyl group substituted by a $C_1$–$C_4$ alkyl group can be mentioned.

The number of the substituents of $Q_1$ or $Q_2$ in the formula (1) is usually two or less, though the number is not limited as long as the object of the present invention can be achieved.

$R_4$, $R_5$ and $R_6$ in the formula (1) are the same or different and each a hydrogen atom, a halogen atom, a hydroxy group, a sulfonic acid group or an amino, alkyl, alkoxy, carbamoyl and sulfamoyl group which may be optionally substituted.

As examples of the substituted amino, alkyl, alkoxy, carbamoyl and sulfamoyl group represented by $R_4$, $R_5$ or $R_6$, substituted amino, alkyl, alkoxy, carbamoyl and sulfamoyl groups mentioned above as examples of substituents of $Q_1$ or $Q_2$ can be mentioned.

$R_1$, $R_2$ and $R_3$ in the formula (2), (3) and (4) are the same or different and each a hydrogen atom, a halogen atom, a carboxyl group, a hydroxyethylsulfone group or an amino, alkyl, alkoxy, carbamoyl and sulfamoyl group which may be optionally substituted by an above-mentioned substiuent.

Among the above-mentioned compounds, a tetrakisazo compound represented by the following formula (5) in the free acid form is particularly preferred for an ink, particularly an ink for ink-jet printing.

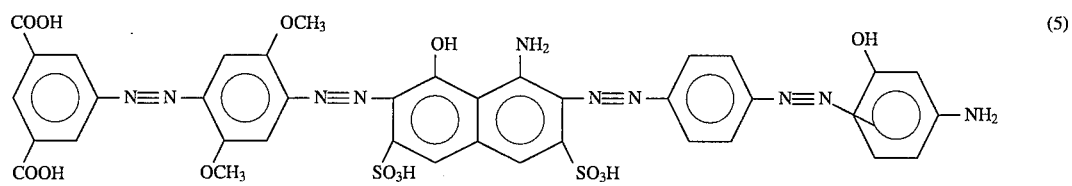

The tetrakisazo compound of the present invention is usually obtained in the form of free acid or a salt thereof. Examples of the salts thereof include an alkali-metal salt such as sodium, lithium or potassium salt, an ammonium salt, a quaternary ammonium salt such as a tetramethylammonium or tetraethylammonium salt and an organic amine salt such as an ethanolamine, propanolamine, diethanolamine or triethanolamine salt.

Among the tetrakisazo compound represented by the formula (5), a compound represented by the following formula (6) is particularly preferred for an ink, particularly an ink for ink-jet printing.

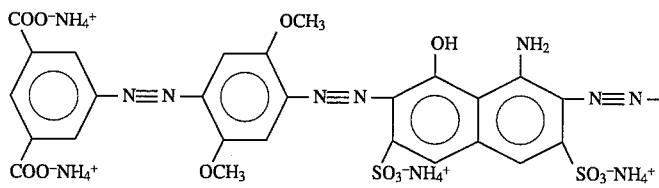
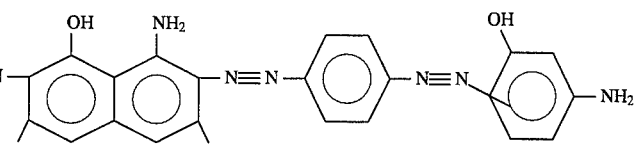

The tetrakisazo compound of the present invention represented by the formula (1) can be easily prepared from starting materials corresponding to each portion of the compound according to a known process, such as a process described in JP-A-63-105079, JP-A-55-144069 or DE-943662 ("DE" means the specification of German patent). As examples of the processes, the following process can be mentioned:

An amino coumpound represented by the formula (7)

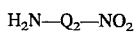 (7)

wherein $Q_2$ is as defined above, is diazotized, then the diazonium compound thus obtained is coupled with an aminonaphthol compound represented by the following formula (8) in the free acid form;

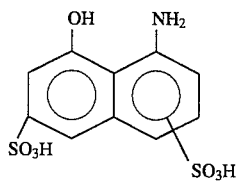 (8)

in an aqueous medium under acidic conditions to obtain a monoazo compound represented by the following formula (9) in the free acid form:

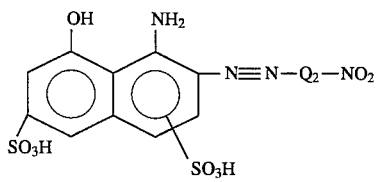 (9)

wherein $Q_2$ is as defined above.

The reduction of the nitro group of the monoazo coumpound of the formula (9) is conducted according to an conventional reduction process to obtain a monoazo compound represented by the following formula (10) in the free acid form:

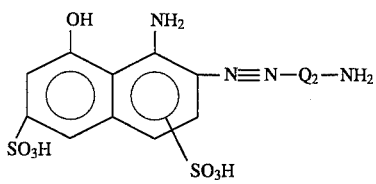 (10)

wherein $Q_2$ is as defined above.

A carboxylic acid compound represented by the following formula (11) is diazotized in a usual manner;

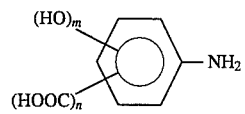 (11)

wherein m and n are as defined above, then the diazonium compound thus obtained is coupled with an aromatic amine compound represented by the following formula (12);

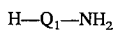 (12)

wherein $Q_1$ is as defined above, in an aqueous medium under acidic conditions to obtain a monoazo compuond represented by the following formula (13):

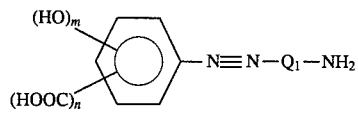 (13)

wherein $Q_1$, m and n are as defined above. Then, the monoazo compound of the formula (13) is diazotized in a usual manner, and the diazonium compound thus obtained is coupled with the monoazo compound of the formula (10) in a weakly acidic, neutral or weakly alkaline aqueous medium to obtain a trisazo compound represented by the following formula (14) in the free acid form:

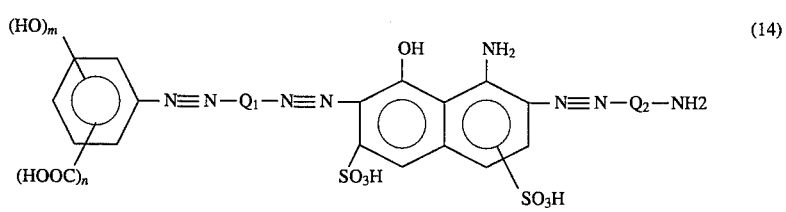 (14)

wherein $Q_1$, $Q_2$, m and n are as defined above.

Then, the trisazo compound of formula (14) is diazotized and the resulting diazonium compound is coupled with a compound represented by the following formula (15);

 (15)

wherein $R_4$, $R_5$ and $R_6$ are as defined above, in a weakly acidic, neutral or weakly alkaline aqueous medium to obtain a tetrakisazo compound represented by the formula (1) in the free acid form.

Examples of the amine compound represented by the formula (7) include 1-amino-4-nitrobenzene, 1-amino-2-chloro- 4-nitrobenzene, 1-amino-2-methoxy-4-nitrobenzene, 1-amino-2 -ethoxy-4-nitrobenzene, 5-amino-1-carboxy-2-nitrobenzene and 5-amino-1-carbamoyl-2-nitrobenzene.

Examples of the aminonaphthol compound represented by the formula (8) include 1-amino-8-naphthol-3,6-disulfonic acid and 1-amino-8-naphthol-4,6-disulfonic acid.

Examples of the carboxylic acid compound represented by the formula (11) include 3-aminophthalic acid, 4-aminophthalic acid, 2-aminoisophthalic acid, 4-aminoisophthalic acid, 5-aminoisophthalic acid, 3-aminobenzoic acid, 4-aminobenzoic acid, 3-aminosalicylic acid, 4-aminosalicylic acid and 5-aminosalicylic acid. Among them, 5-aminoisophthalic acid or 5-aminosalicylic acid is preferably used.

Examples of the aromatic amine compound represented by the formula (12) include aniline derivatives and aminonaphthalene derivatives such as 1-amino-2,5-dimethoxybenzene, 1-amino-2,5-diethoxybenzene, 1-amino-2-methoxybenzene, 1-amino-2-ethoxybenzene, 1-amino-5-methyl-2-methoxybenzene, 1-amino-2-chlorobenzene, 1-amino-2,5-dichlorobenzene, 1-amino-2-carbamoylbenzene, 1-amino-2-sulfamoylbenzene, 1-amino-3-carbamoylbenzene, 1-amino-3-sulfamoylbenzene, 1-amino-3-β-hydroxyethylsulfonylbenzene, 1-amino-2-acetylaminobenzene, 1-amino-5-acetylamino-2-methoxybenzene, 1-amino-5-carboxy-2-methoxybenzene, 1-amino- 5-carbamoyl-2-methoxybenzene, 1-amino-5-carbamoyl-2-chlorobenzene, 1-amino-2-methoxy-5-sulfamoylbenzene, 1-aminonaphthalene, 1-aminonaphthalene-6-sulfonic acid, 1-aminonaphthalene- 7-sulfonic acid, 1-aminonaphthalene-6-sulfonic amide and 1-aminonaphthalene-7-sulfonic amide. Among them, 1-amino-2,5-dimethoxybenzene or 1-amino-5-methyl-2-methoxybenzene is preferably used.

Examples of the compound represented by the formula (15) include benzoic acid derivatives, aniline derivatives, phenol derivatives and aminophenol derivatives, such as 1-hydroxybenzene, 1-hydroxy-2-methylbenzene, 1-hydroxy-3-methyl-benzene, 1-hydroxy-4-methylbenzene, 1,3-dihydroxybenzene, 1-hydroxy-3-methoxy-benzene, 1-hydroxy-3-aminobenzene, 3-di(β-hydroxyethyl)amino-1-hydroxybenzene, 1-di(β-hydroxyethyl)aminobenzene, 1,3-diamino- 4-methylbenzene, 2-hydroxy benzoic acid, 1,3-diaminobebzene- 6-sulfonic acid, 1-acetylamino-4-methoxy-3-di(β-hydroxyethyl)aminobenzene, 3-diethylamino-1-hydroxybenzene, 1,3-diaminobenzene-4-sulfonic acid and 3-amino benzoic acid. Among them, 1-hydroxy-3-aminobenzene is preferably used.

The tetrakisazo compound of the present invention represented by the formula (1) is usable either singly or in the form of a mixture for dyeing and printing various fiber materials which include fiber material having hydroxy and/ or amino group. It is particularly useful for dyeing and printing cellulose fiber such as rayon or cotton, paper, leather, silk and synthetic polyamide. Since the tetrakisazo compound of the present invention exhibits a good solubility as well as a high fixation property, it can give a deep black colored dyed propduct.

The tetrakisazo compound of the present invention exhibits excellent properties when used for an ink, particularly ink for ink-jet printing. The ink for ink-jet printing usually comprises 0.5–20 weight parts, preferably 1–15 weight parts, of the tetrakisazo compound, 1–80 weight parts, preferably 2–60 weight parts, of an organic solvent and 0–98.5 weight parts, preferably 20–90 weight parts, of water based on 100 weight parts of ink. The ink may further comprise compounds which have been conventionally used for an aqueous ink which include known dyes, as long as they do not cause an adverse effect on the preferred properties of the tetrakisazo compound.

Examples of the organic solvent usable for the ink include alcohols such as methanol, ethanol, n-propanol, isopropanol, n-butanol, sec-butanol, tert-butanol, iso-butanol or benzyl alcohol; amides such as dimethylformamide or diethylformamide; ketches and ketone alcohols such as acetone or diacetonealcohol; ethers such as tetrahydrofuran or dioxane; alkylene glycols and thioglycols such as ethylene glycol, propylene glycol, butylene glycol, pentane diol, diethylene glycol, triethlene glycol, tetraethylene glycol, thiodiglycol, hexylene glycol, 2-methyl-2,4-pentanediol, glycerine, 1,2, 6-hexanetriol; polyalkylene glycols such as polyethylene glycol or polypropylene glycol; lower alkyl ether of polyol such as ethyleneglycol monoethylether, ethyleneglycol monobutylether, diethyleneglycol monomethylether, diethyleneglycol monoethylether, diethyleneglycol monobutylether, triethyleneglycol monomethylether, triethyleneglycol monoethylether, propyleneglycol monomethylether, propyleneglycol monoethylether, propyleneglycol monobutylether, propyleneglycol monophenylether, dipropyleneglycol monobutylether, triethyleneglycol monomethylether, triethyleneglycol monoethylether; acetylene glycol derivative (Surfinol: manufactured by Nisshin Chemical Co., Ltd.); alkanol amines such as monoethanolamine, diethanolamine or triethanolamine; and N-containing heterocyclic ketones such as 1,3-dimethyl-2-imidazolidine, 2-pyrrolidone, N-methyl-2-pyrrolidone, N-ethyl- 2-pyrrolidone, N-vinyl-2-pyrrolidone, N-octyl-2-pyrrolidone, N-(2-hydroxyethyl)-2-pyrrolidone, N-cyclohexyl- 2-pyrrolidone, N-dodecyl-2-pyrrolidone, N-isopropyl-2-pyrrolidone, N-(n-butyl)-2-pyrrolidone, N-(t-butyl)-2-pyrrolidone, N-hexyl-2-pyrrolidone, N-(3-hydroxypropyl)-2-pyrrolidone, N-(2-methoxyethyl)-2-pyrrolidone, N-(3-methoxypropyl)-2-pyrrolidone, N-benzyl-2-pyrrolidone and polyvinylpyrrolidone.

These organic solvents may be used singly or as a combination of two or more, as long as they cause no adverce infulence one another. 2-pyrrolidone and its derivatives are preferably used as the organic solvent or as a part of the organic solvent.

If desired, various additives conventionally used for ink may be added to the ink for ink-jet printing in order to further improve its properties, Examples of the additives include a rotproofing or mildewproofing agent such as sodium dehydroacetate or 4-chloro-3-methylphenol. Other various additives such as an ultraviolet absorber,a viscosity regulator, a surface tension regulator such as a surface active agent, a pH regulator, a resistivity regulator, an infrared red absorber or a penetrant may also be used.

The aqueous ink can be easily prepared by dissolving the tetrakisazo compound of the formula (1), a water-soluble organic solvent and, if necessary, various types of additives in water, preferably, at an elevated temperature, followed, without cooling or after cooling, by filtering the resulting solution through a membrane filter having very fine pore size in order to remove impurities.

The ink containing the tetrakisazo coumpound of the present invention is excellent in jet stability and storage stability. The ink gives clear recording images having good properties such as heat resistance, water resistance and light fastness, when it is used for ink-jet printing. The ink is free from clogging of a nozzle even after ink-jet printing of a long period of time. Since the ink exhibits various excellent properties as mentiond above, it is particularly useful as an ink for ink-jet recording. The ink is also useful as an ink for e.g. a fountain pen, a felt pen or a ball-point pen.

The present invention is now illustrated in more detail by the examples below, which should not be construed to limit the invention. In the examples, "part" and "%" mean "part by weight" and "% by weight", respectively.

EXAMPLE 1

13.8 Parts of p-nitroaniline were diazotized according to a conventional manner and the diazonium compound thus obtained was coupled with 31.9 parts of 1-amino- 8-naphthol-3,6-disulfonic acid at 0°–5° C. under acidic conditions. After 10% aqueous soda ash solution was added thereto and pH of the reaction mass was adjusted in 6.5–7.0, the reduction of the nitro group was conducted by adding 11.7 parts of sodium sulfide thereto, followed by agitating the reaction mass at the room temperature for one hour. After 35% hydrochloric acid was added thereto to adjust the pH in 1.5–2.0, the reaction mass was agitated for one hour and filtered to obtain 146 parts of wet cake of a monoazo compound represented by the following formula (A):

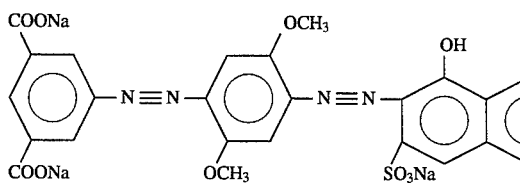

18.1 Parts of 5-aminoisophthalic acid were diazotized according to a conventional manner and the diazonium compound thus obtained was coupled with 15.3 parts of 2,5-dimethoxyaniline at 0°–5° C. under weakly acidic conditions. Then, the reaction mass was filtered to obtain 112 parts of wet cake of a monoazo compound represented by the following formula (B):

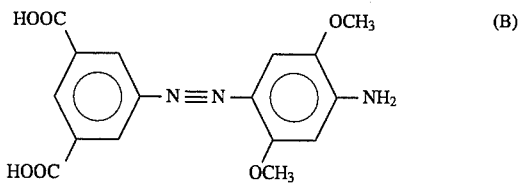

The monoazo compound of formula (B) was completely dissolved in 150 parts of 10% aqueous soda ash solution and 9.8 parts of 36% aqueous sodium nitrite solution was added thereto. Then, the resulting solution was added to 31 parts of 35% aqueous hydrochloric acid solution to diazotized the monoazo compound (B), After the monoazo compound of formula (A) was dissolved in 10% aqueous soda ash solution to completely dissolve the monoazo compound (A) and pH was adjusted in 10.5–11.0 to completely dissolve the monoazo compound (A). To the resulting solution, the solution of the diazonium compound obtained from the monoazo compound (B) as mentioned above was added, and the pH was adjusted in 7.5–8.0, Then, the solution thus obtained was agitated for three hours at 10°–15° C. to conduct the coupling reaction, The reaction mass of the trisazo compound thus obtained was salted out by adding 50 parts of sodium chloride thereto, and the crystalline products precipitated were filtered to obtain 270 parts of wet cake of the trisazo compound represented by the following formula (C):

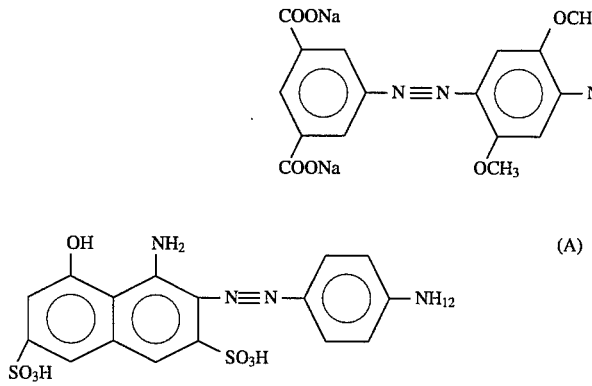

The wet cake of the trisazo compound of formula (C) was completely dissolved in 100 parts of 10% aqueous soda ash solution and 9.8 parts of 36% aqueous sodium nitrite solution was added thereto. The resulting solution was added to 57 parts of 35% aqueous hydrochloric acid solution to diazotized the trisazo compound (C). To the resulting mass, 10.9 parts of m-aminophenol was added and the coupling reaction was conducted by agitating the resulting solution for three hours at 10°–15° C. under weakly alkaline conditions (pH 8–8.5).

The reaction mass of the tetrakisazo compound thus obtained was salted out by adding 50 parts of sodium chloride thereto, and the crystalline products precipitated were filtered and washed with 200 parts of 10% aqueous sodium chloride solution to obtain 305 parts of the wet cake.

The wet cake thus obtained was dispersed in 200 parts of mixed solvent of isopropyl alcohol and water (1/1) and filtered, After salt in the wet cake was completely removed, the wet cake was dried to obtain 65.8 parts of tetrakisazo compound represented by the following formula (D):

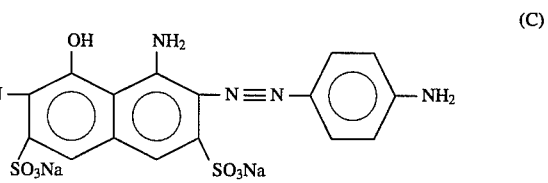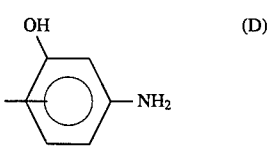

Measured in an aqueous medium, $\lambda_{max}$, of this tetrakisazo coumpound was 654 nm.

EXAMPLE 2

Example 1 was repeated, except that 18.1 parts of 5-aminoisophthalic acid were replaced by 13.7 parts of 3-aminobenzoic acid to obtain 63.1 parts of the tetrakisazo compound represented by the following formula (E):

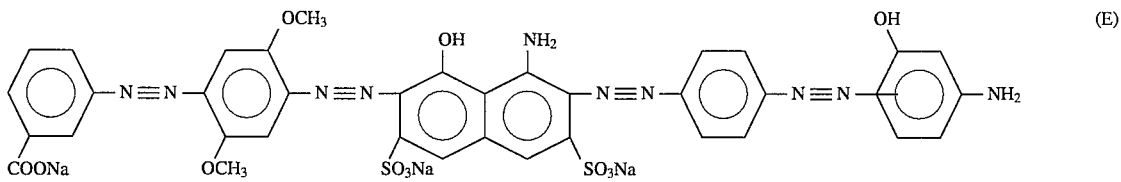

Measured in an aqueous medium, $\lambda_{max}$, of this tetrakisazo coumpound was 653 nm.

EXAMPLE 3

Example 1 was repeated, except %hat 2,5-dimethoxyaniline was replaced by 1-amino-2-methoxy-5-acetylaminobenzene to obtain 70.3 parts of tetrakisazo compound represented by the following formula (F):

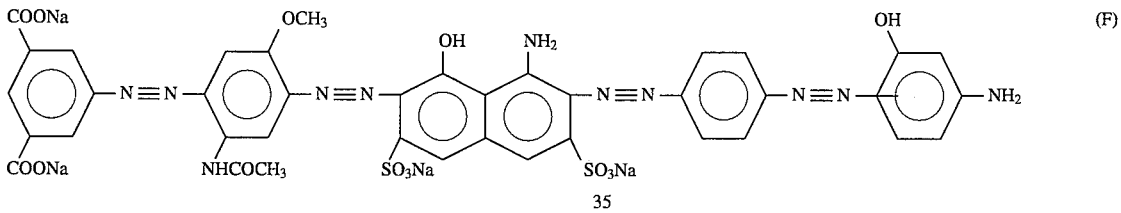

Measured in an aqueous medium, $\lambda_{max}$, of this tetrakisazo coumpound was 652 nm.

EXAMPLE 4

10 parts of the tetrakisazo compound of formula (D) obtained in Example 1 were added to 100 parts of aqueous ammonium bicarbonate solution. The resulting mixture was agitated for 2 hours, then filtered to obtain a wet cake. After salt in the wet cake were removed completely, the wet cake was dried to obtain the ammonium salt of the tetrakisazo compound represented by the following formula (G):

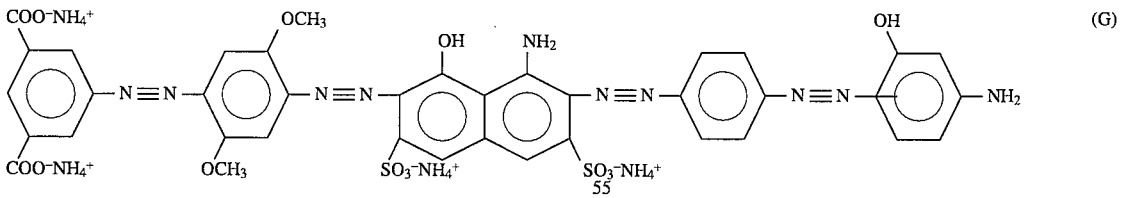

EXAMPLE 5

Using each of the tetrakisazo compounds obtained in Example 1-4, inks of the following formulation were prepared and the inks were filtered through membrane filters having the pore diameter of 0.2 μm to obtain inks for ink-jet printing.

| | |
|---|---|
| Tetrakisazo compound obtained in Example 1, 2, 3 or 4 | 2 parts |
| Glycerine | 4 parts |
| 2-Pyrrolidone | 10 parts |
| Ethanol | 4 parts |
| 4-Chloro-3-methylphenol | $8.0 \times 10^{-3}$ parts |
| Deionized water | 80 parts |

Ink catridges of a Desk Jet505 ink-jet printer (manufactured by Hewlett Packard Co., Ltd.) were filled with each of the inks thus obtained, and ink-jet printing was conducted continuously for 500 hours using the ink-jet printer. No clogging of the nozzle took place and no abnormality of jet-direction was observed.

After the ink was stored for 3 months at 40° C., ink-jet printing was conducted continuously for 500 hours by using the ink-jet printer. No clogging of the nozzle took place and no abnormality of jet-direction was observed.

EXAMPLE 6

For comparison, an ink was prepared according to the same manner as in Example 5 except that the tetrakisazo compound used in Example 5 was replaced by a known dye, C.I. Direct Black 154 or C.I. Direct Black 168. Test samples were prepared by coating rectangular areas of 3 cm length and 10 cm width on ordinary copying papers manufactured by Xerox Corporation (paper No. 4024) with the ink thus prepared in this Example and the ink obtained in Example 5. Water resistance tests and light fastness tests were conducted according to the methods described below. The results are shown in Table 1. All the printed images have a clear black color tone.

Water resistance test

Each Test sample was dried in the air for two days and the reflection density of the coated area was measured by a reflection densitometer (Macbeth RD915. Hereinafter, the reflection density is denoted by D1). Then, each sample was dipped in 25° C. deionized water for one hour, followed by removing the water and drying the test sample in the air for one day. Then, the reflection density of the coated area was measured (Hereinafter, the reflection density is denoted by D2) and Water resistance was evaluated according to the following criterion:

⊚ D2/D1×100 is 80 or more.
o D2/D1×100 is 70 or more and less than 80.
Δ D2/D1×100 is 50 or more and less than 70.
x D2/D1×100 is less than 50.

Light fastness test

Each Test sample was irradiated by using a Xenon fade meter (manufactured by Suga Shikenki Co., Ltd.) for 100 hours. After the irradiation, the reflection density of the coated area was measured by a reflection densitometer (Hereinafter, the reflection density is denoted by D3) and Light fastness was evaluated according to the following criterion:

TABLE 1

⊚ D3/D1 × 100 is 90 or more.
o D3/D1 × 100 is 80 or more and less than 90.
Δ D3/D1 × 100 is 70 or more and less than 80.
x D3/D1 × 100 is less than 70.

| Tetrakisazo compound | Water resistance | Light fastness |
|---|---|---|
| Compound (D) obtained in Example 1 | ⊚ | ⊚ |
| Compound (E) obtained in Example 2 | o | ⊚ |
| Compound (F) obtained in Example 3 | o | o |
| Compound (G) obtained in Example 4 | ⊚ | ⊚ |
| C.I. Direct Black 154 = Comparative Example 1 | o | x |
| C.I. Direct Black 168 = Comparative Example 2 | Δ | Δ |

EXAMPLE 7

According to tha same manner as in Example 1, except that the starting materials are changed, tetrakisazo compounds represented by the following formulae can be obtained.

Examples 5 and 6 are repeated except that the tetrakisazo compounds represented by the following formulae are used instead of the compounds used in Examples 5 and 6. The colors of the test samples thus obtained are shown by each of the formulae of the tetrakisazo compound used.

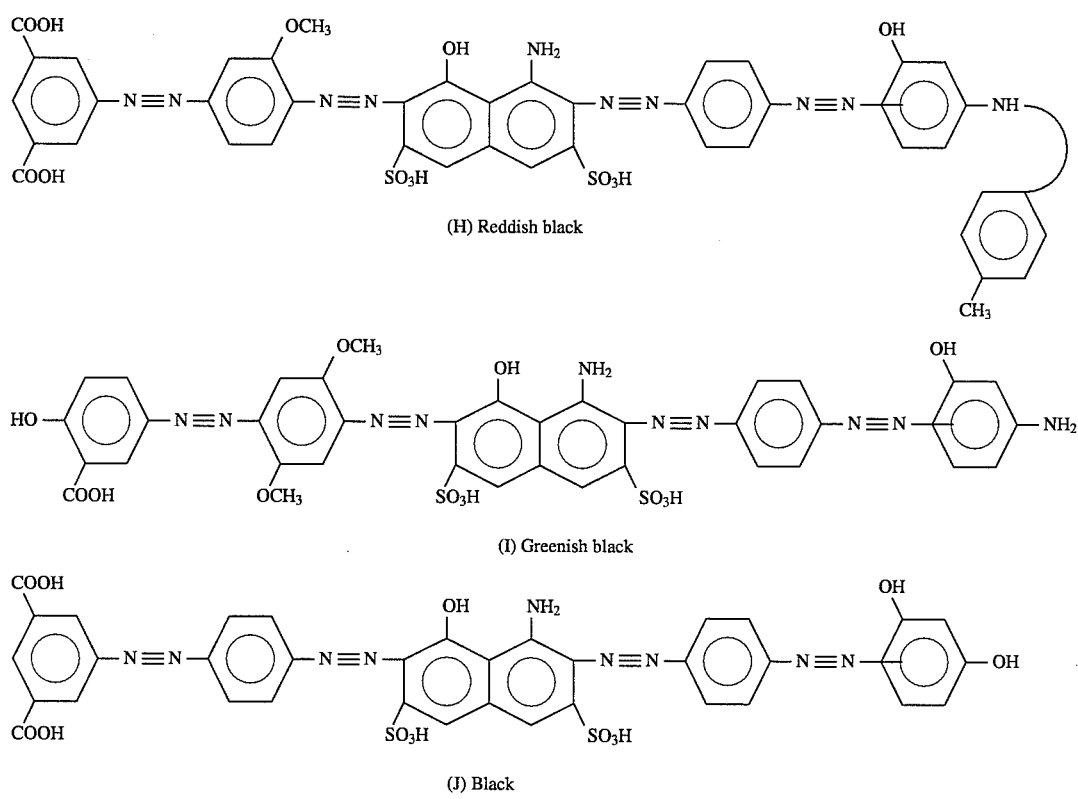

(H) Reddish black (I) Greenish black (J) Black

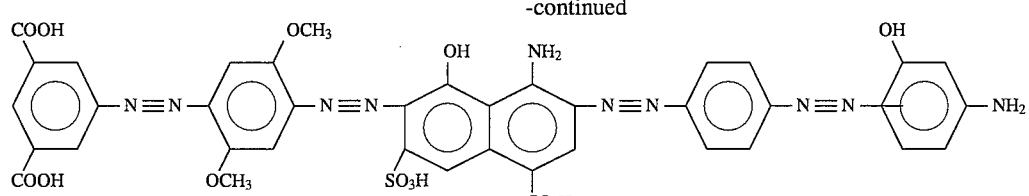
(K) Black
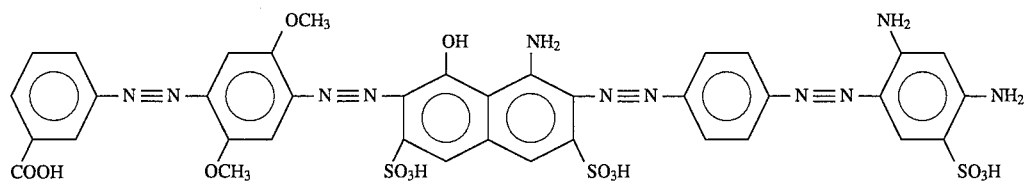
(L) Greenish black
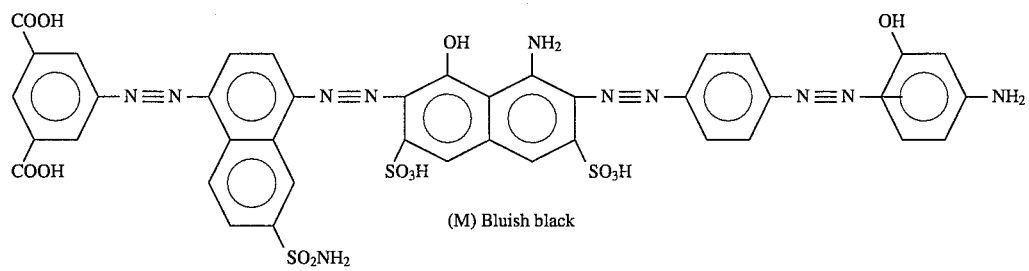
(M) Bluish black
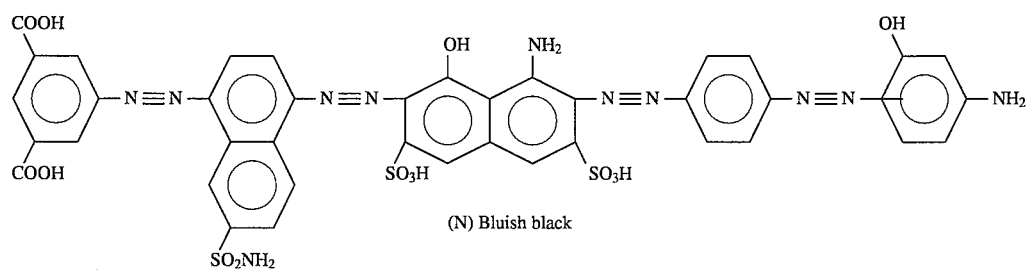
(N) Bluish black
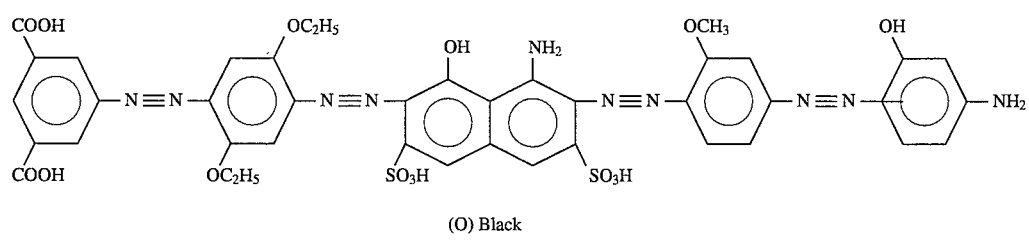
(O) Black
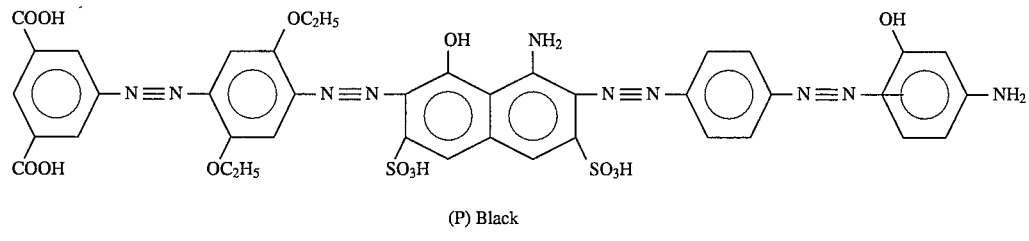
(P) Black
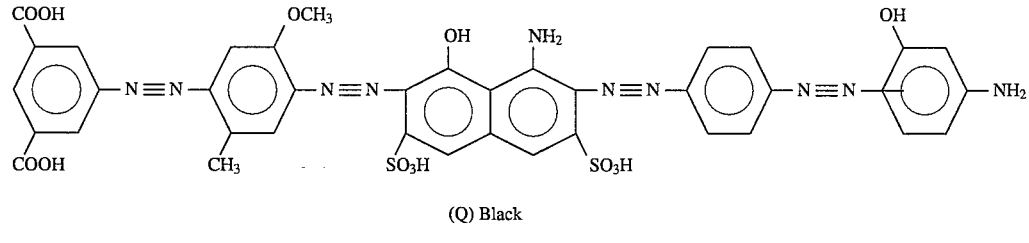
(Q) Black

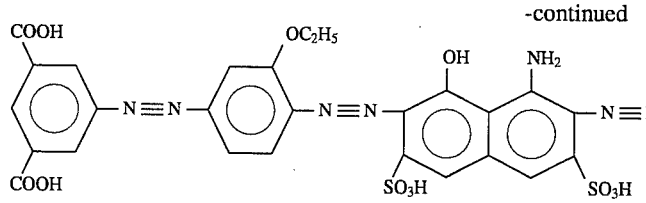
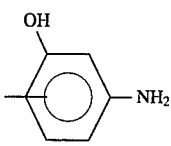

(R) Black

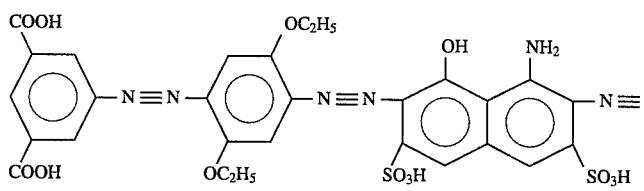

(S) Black

EXAMPLES 8–15

Using each of the tetrakisazo compounds obtained in Example 1–4 and the salt thereof, ink compositions of the following formulation were prepared and the ink compositions were filtered through a membrane filter to obtain inks for ink-jet recording.

EXAMPLE 8

| | |
|---|---|
| Potassium salt of tatrakisazo compound (D) obtained in Example 1 | 3.0% |
| Polyethylene glycol #200 | 8.0% |
| Diethylene glycol | 3.0% |
| Sodium dehydroacetate | 0.1% |
| Deionized water | 85.9% |

EXAMPLE 9

| | |
|---|---|
| Tetrakisazo compound (D) obtained in Example 1 | 3.0% |
| N-ethyl-2-pyrrolidone | 5.0% |
| Glycerine | 5.0% |
| Sodium dehydroacetate | 0.1% |
| Deionized water | 86.9% |

EXAMPLE 10

| | |
|---|---|
| Tetrakisazo compound (E) obtained in Example 2 | 3.0% |
| N-isopropyl-2-pyrrolidone | 7.0% |
| Propylene-glycol monomethylether | 3.0% |
| 4-Chloro-3-methylphenol | 0.08% |
| Deionized water | 86.92% |

EXAMPLE 11

| | |
|---|---|
| Potassium salt or tetrakisazo compound (E) obtained In Example 2 | 3.0% |
| N-ethyl-2-pyrrolidone | 10.0% |
| 4-Chloro-3-methylphenol | 0.08% |
| Deionized water | 86.92% |

EXAMPLE 12

| | |
|---|---|
| Tetrakisazo compound (F) obtained in Example 3 | 3.0% |
| N-ethyl-2-pyrrolidone | 10.0% |
| Monoethanol amine | 0.2% |
| 4-Chloro-3-methylphenol | 0.08% |
| Deionized water | 86.72% |

EXAMPLE 13

| | |
|---|---|
| Tetrakisazo compound (G) obtained in Example 4 | 3.0% |
| N-ethyl-2-pyrrolidone | 5.0% |
| N-n-butyl-2-pyrrolidone | 5.0% |
| N-isopropyl-2-pyrrolidone | 5.0% |
| 4-Chloro-3-methylphenol | 0.08% |
| Deionized water | 81.92% |

EXAMPLE 14

| | |
|---|---|
| Tetrakisazo compound (G) obtained in Example 4 | 3.0% |
| N-methyl-2-pyrrolidone | 10.0% |
| 4-Chloro-3-methylphenol | 0.08% |
| Isopropyl alcohol | 3.0% |
| Deionized water | 83.92% |

EXAMPLE 15

| | |
|---|---|
| Tetrakisazo compound (D) obtained in Example 1 | 3.0% |
| N-ethyl-2-pyrrolidone | 5.0% |
| Glycerine | 4.0% |
| Polyvinylpyrrolidone | 1.0% |
| Sodium dehydroacetate | 0.1% |
| Deionized water | 86.9% |

The pH, viscosity and surface tention of all of these inks were in the range of pH 6–10, 1.2–3.0 cps and 35–60 dyne/cm, respectively. The properties or these inks were measured according to the methods 1)–9) described below. All of the inks of the present invention (Examples 8–15) exhibit excellent properties.

1) Clarity of printed image

Ink-jet printing was conducted on an ordinary paper (HG5130 manufactured by Epson Co., Ltd.) using a Desk Jet505 ink-jet printer (manufactured by Hewlett Packard

19

Co., Ltd.). The clarity of the printed image was evaluated visually. All of the printed images obtained by using the ink of Example 8–15 are clear blotless black images.

2) Storage Stability

The inks of Examples 8–15 were sealed in glass vessels and kept for 6 months at 20° C. and for 2 weeks at 70° C. No deposition or abnormality was observed.

3) Jet stability

Using a Desk Jet505 ink-jet printer (manufactured by Hewlett Packard Co., Ltd.) and the inks of Examples 8–15, ink-jet printing was conducted on an ordinary paper (HG5130 manufactured by Epson Co., Ltd.) continuously for 500 hours, while observing the clogging of nozzle and the jet direction. No abnormality was observed.

4) Jet response

After ink-jet printing was conducted as in 1), the ink-jet printer was left for one month in a room of normal atomospheric environment and for one week at 40° C., 30% RH. Thereafter, ink-jet printing was conducted again according to the same condition as to 1). No abnormality was observed.

5) Light fastness

Measured according to the same manner as described in Example 6, all of the inks of Example 8–15 gave a printed image having excellent light fastness.

6) Discoloration resistance

Ink-jet printing was conducted according to the same condition as to 1). Printed paper was left in a room of normal atomospheric environment for 1 month and the discoloration of the printed image was evaluated visualy. No discoloration was observed.

7) Water resistance

Measured according to the same manner as described in Example 6, all of the inks of Examples 8–15 gave a printed image having excellent water resistance.

8) Permeability

After ink-jet printing was conducted as in 1), the printed image was wiped with a filter paper, Lapse of time from the printing until the printed image becomes not to blot the filter paper was measured. In all of Examples 8–15 the time is 30 second or less.

9) Blot resistance

After ink-jet printing was conducted as in 1), a mark was drawn over the printed image with a felt pen (ZEBRA OPTEX) and a blot of the printed image caused by the mark was observed. Almost no blot was observed.

What we claim is:

1. A tetrakisazo compound represented by the following formula (1) in the free acid form:

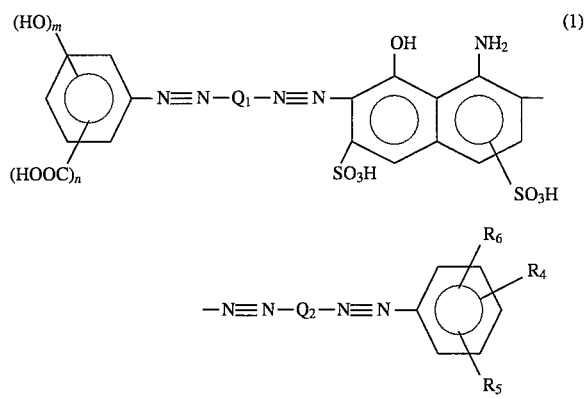

wherein $Q_1$ and $Q_2$ independently represent phenylene or naphthylene group which may be optionally substituted, $R_4$, $R_5$ and $R_6$ independently represent a hydrogen atom, a halogen atom, a hydroxy group, a sulfonic acid group or an amino, alkyl, alkoxy, carbamoyl or sulfamoyl group which may be optionally substituted, m is 0 or 1 and n is 1 or 2; or a salt thereof.

2. A tetrakisazo compound represented by the following formula (2) in the free acid form:

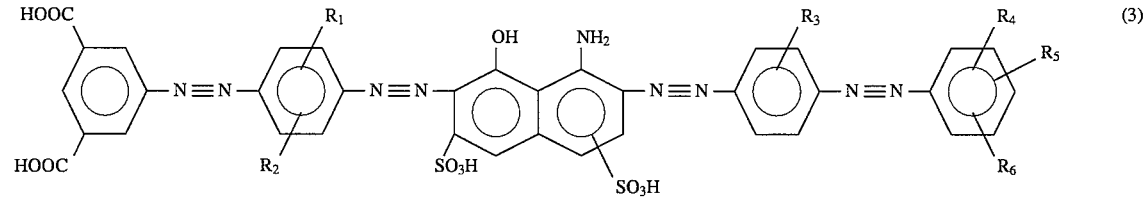

wherein $R_1$, $R_2$ and $R_3$ independently represent a hydrogen atom, a halogen atom, a carboxyl group, a hydroxyethylsulfo n group or an amino, alkyl, alkoxy, carbamoyl or sulfamoyl group which may be optionally substituted and $R_4$, $R_5$, $R_6$, m and n are as defined in claim 1; or a salt thereof.

3. A tetrakisazo compound represented by the following formula (3) in the free acid form:

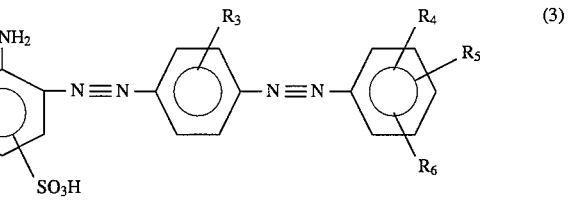

wherein $R_1$, $R_2$ and $R_3$ independently represent a hydrogen atom, a halogen atom, a carboxyl group, a hydroxyethylsulfon group or an amino, alkyl, alkoxy, carbamoyl or sulfamoyl group which may be optionally substituted and $R_4$, $R_5$ and $R_6$ are as defined in claim 1; or a salt thereof.

4. A tetrakisazo compound represented by the following formula (4) in the free acid form:

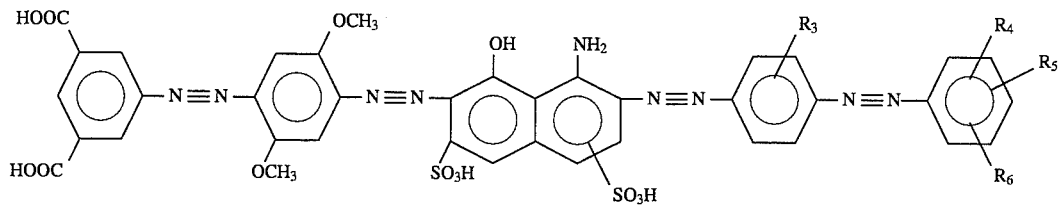

wherein $R_3$ represents a hydrogen atom, a halogen atom, a carboxyl group, a hydroxyethylsulfon group or an amino, alkyl, alkoxy, carbamoyl or sulfamoyl group which may be optionally substituted and $R_4$, $R_5$ and $R_6$ are as defined in claim 1; or a salt thereof.

5. A tetrakisazo compound represented by the following formula (5) in the free acid form:

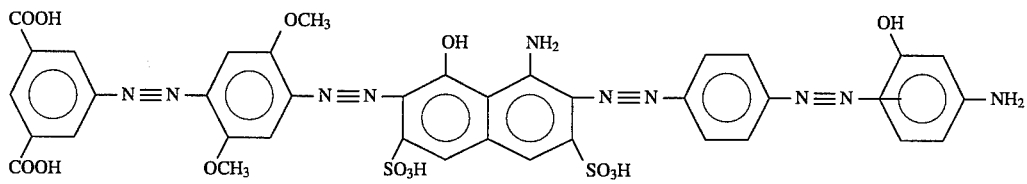

or a salt thereof.

6. A tetrakisazo compound represented by the following formula (6):

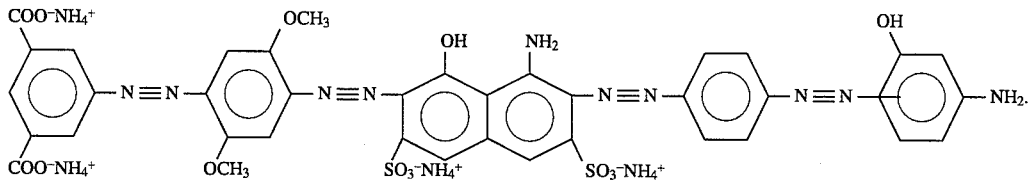

7. An ink which comprises the tetrakisazo compound according to claim 1.

8. An ink which comprises the tetrakisazo compound according to claim 1, an organic solvent and water.

9. The ink according to claim 8 wherein the organic solvent contains a compound selected from the group consisting of 2-pyrrolidone, N-methyl-2-pyrrolidone, N-ethyl-2-pyrrolidone, N-vinyl-2-pyrrolidone, N-octyl-2-pyrrolidone, N-(2-hydroxyethyl)-2-pyrrolidone, N-cyclohexyl-2-pyrrolidone, N-dodecyl-2-pyrrolidone, N-isopropyl-2-pyrrolidone, N-(n-butyl)-2-pyrrolidone, N-(t-butyl)-2-pyrrolidone, N-hexyl-2-pyrrolidone, N-(3-hydroxypropyl)-2-pyrrolidone, N-(2-methoxyethyl)-2-pyrrolidone, N-(3-methoxypropyl)-2-pyrrolidone, N-benzyl-2-pyrrolidone and N-polyvinylpyrrolidone.

10. The ink according to claim 8 which comprises 1–15 weight parts of the tetrakisazo compound, 2–60 weight parts of an organic solvent and 20–90 weight parts of water based on 100 weight parts of ink.

11. The ink according to claim 8 which is for ink jet printing.

* * * * *